(12) United States Patent
Feng et al.

(10) Patent No.: US 10,528,400 B2
(45) Date of Patent: Jan. 7, 2020

(54) DETECTING DEADLOCK IN A CLUSTER ENVIRONMENT USING BIG DATA ANALYTICS

(71) Applicant: INTERNATIONAL BUSINESS MACHINES CORPORATION, Armonk, NY (US)

(72) Inventors: Shuo Feng, Beijing (CN); Zhi Hong Ma, Beijing (CN); Zhiyong Tian, Beijing (CN); Yan Zhang, Beijing (CN); Jia Wei Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 43 days.

(21) Appl. No.: 15/613,850

(22) Filed: Jun. 5, 2017

(65) Prior Publication Data
US 2018/0349210 A1    Dec. 6, 2018

(51) Int. Cl.
*G06F 9/46* (2006.01)
*G06F 9/52* (2006.01)
*G06F 13/40* (2006.01)
*G06F 11/34* (2006.01)

(52) U.S. Cl.
CPC .......... *G06F 9/524* (2013.01); *G06F 11/3404* (2013.01); *G06F 11/3452* (2013.01); *G06F 13/4036* (2013.01); *G06F 9/466* (2013.01)

(58) Field of Classification Search
None
See application file for complete search history.

(56) References Cited

U.S. PATENT DOCUMENTS

| 5,835,766 | A  | * | 11/1998 | Iba ......................... G06F 9/466 718/104 |
| 6,490,630 | B1 |   | 12/2002 | Poon et al. |
| 6,597,907 | B1 |   | 7/2003  | Pruitt et al. |
| 7,519,965 | B2 | * | 4/2009  | Yoshida .................. G06F 9/524 718/100 |
| 7,702,610 | B2 | * | 4/2010  | Zane ................. G06F 17/30421 707/999.001 |
| 7,735,089 | B2 | * | 6/2010  | Chan ....................... G06F 9/524 710/200 |
| 7,783,806 | B2 |   | 8/2010  | Nir-Buchbinder et al. |
| 8,108,878 | B1 | * | 1/2012  | Pulsipher ................ G06F 9/524 718/100 |
| 8,286,182 | B2 |   | 10/2012 | Chan |
| 8,868,604 | B2 |   | 10/2014 | Li |

(Continued)

OTHER PUBLICATIONS

Cai et al., "Magiclock: Scalable Detection of Potential Deadlocks in Large-Scale Multithreaded Programs," IEEE Transactions on Software Engineering, vol. 40, Issue 3, Mar. 2014 (3 pages).

*Primary Examiner* — Abu Zar Ghaffari
(74) *Attorney, Agent, or Firm* — Griffiths & Seaton PLLC

(57) ABSTRACT

Detecting deadlock in a distributed computing environment. Potential deadlocks between resources of nodes in a computing cluster by determining resource reverse pairs of the resources for each transaction from trace or log files using data analytics. The potential deadlocks are identified offline by matching a global or local resource between the nodes in sub-transactions of each transaction as recursively identified from a transaction resource chain.

15 Claims, 8 Drawing Sheets

(56) References Cited

U.S. PATENT DOCUMENTS

| | | |
|---|---|---|
| 8,886,910 B2 | 11/2014 | Mehra et al. |
| 9,052,967 B2 | 6/2015 | Gao et al. |
| 9,298,507 B2 * | 3/2016 | Brown .................. G06F 9/5016 |
| 2002/0083243 A1 * | 6/2002 | Van Huben ............. G06F 9/524 |
| | | 710/107 |
| 2003/0101300 A1 * | 5/2003 | Goldick .................... G06F 9/52 |
| | | 710/200 |
| 2004/0148420 A1 * | 7/2004 | Hinshaw ........... G06F 17/30477 |
| | | 709/231 |
| 2007/0174185 A1 * | 7/2007 | McGoveran ........ G06F 11/1474 |
| | | 705/39 |
| 2008/0172429 A1 * | 7/2008 | Lin ..................... G06F 16/2343 |
| 2008/0282244 A1 * | 11/2008 | Wu .......................... G06F 9/524 |
| | | 718/100 |
| 2009/0138886 A1 * | 5/2009 | Anand .................. G06F 9/5027 |
| | | 718/104 |
| 2009/0198548 A1 * | 8/2009 | Kohler .................. G06Q 10/06 |
| | | 705/7.27 |
| 2012/0030657 A1 * | 2/2012 | Gao ........................ G06F 9/524 |
| | | 717/128 |
| 2012/0240119 A1 * | 9/2012 | Xie .................... H04L 43/0811 |
| | | 718/100 |
| 2013/0013833 A1 * | 1/2013 | Nagpal .................. G06F 13/14 |
| | | 710/200 |
| 2013/0054852 A1 | 2/2013 | Fuoco et al. |
| 2015/0281084 A1 * | 10/2015 | Odashima ............... H04L 47/11 |
| | | 709/201 |

* cited by examiner

| Cluster1_FS1_Task1_sub1 | A_Global->a_Local_Node1->B_Global->b_Local_Node2->C_Global->c_Local_Node3->B_Global->d_Local_Node1 |
|---|---|
| Cluster1_FS1_Task1_sub2 | M_Global->m_Local_Node2 |

| RESOURCES | ANCESTOR SET | INHERITOR SET |
|---|---|---|
| A_Global | {} | {a_Local_Node1, B_Global, b_Local_Node2, C_Global, c_Local_Node3, D_Global a_Local_Node1} |
| a_Local_Node1 | {A_Global} | {B_Global, b_Local_Node2, C_Global, c_Local_Node3, D_Global a_Local_Node1} |
| B_Global | {A_Global, a_Local_Node1} | {b_Local_Node2, C_Global, c_Local_Node3, D_Global a_Local_Node1} |
| b_Local_Node2 | {A_Global, a_Local_Node1, B_Global} | {C_Global, c_Local_Node3, D_Global a_Local_Node1} |
| C_Global | {A_Global, a_Local_Node1, B_Global, b_Local_Node2} | {c_Local_Node3, D_Global a_Local_Node1} |
| c_Local_Node3 | {A_Global, a_Local_Node1, B_Global, b_Local_Node2, C_Global} | {D_Global a_Local_Node1} |
| D_Global | {A_Global, a_Local_Node1, B_Global, b_Local_Node2, C_Global, c_Local_Node3} | {a_Local_Node1} |
| M_Global | {} | {m_Local_Node2} |
| m_Local_Node2 | {M_Global} | {} |

FIG. 8B

DETECTING DEADLOCK IN A CLUSTER ENVIRONMENT USING BIG DATA ANALYTICS

BACKGROUND OF THE INVENTION

Field of the Invention

The present invention relates in general to computing systems, and more particularly to, various embodiments for detecting deadlocks within and/or between distributed computing components.

Description of the Related Art

In today's society, computer systems are commonplace. Computer systems may be found in the workplace, at home, or at school. As computer systems become increasingly relied upon, convenient, and portable, the Internet has grown exponentially. Now, more than ever before, individuals and businesses rely upon distributed storage systems, or clusters, to store information and data. As wide strides in technological advancement relating to data access devices have been accomplished, there is an ever-growing demand for growth and development within the back end supporting systems that provide and store the data content.

Reliability and availability are paramount in these back end supporting systems. Thus, it's not uncommon for such systems to incorporate mechanisms to transfer workloads from a failing processor to another processor, take failing memory off line, and balance workloads among the clusters to ensure the systems are available 24 hours per day, 7 days per week. However, in a multi-node system structure, the potential exists for multiple processors or I/O devices to simultaneously request the same block of data to be transferred between the clusters, which can lead to situations where resources on different clusters deadlock against each other, thereby hanging the system.

SUMMARY OF THE INVENTION

Various embodiments for detecting deadlock in a distributed computing environment, by a processor are provided. In one embodiment, by way of example only, a method comprises detecting potential deadlocks between resources of nodes in a computing cluster by determining resource reverse pairs of the resources for each transaction from trace or log files using data analytics. The potential deadlocks are identified offline by matching a global or local resource between the nodes in sub-transactions of each transaction as recursively identified from a transaction resource chain.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 8A is a table diagram illustrating a resource chain for a respective transaction, in accordance with aspects of the present invention; and FIG. 8B is an additional table diagram illustrating a resource chain between an ancestor set and an inheritor set of resources for a respective transaction, in accordance with aspects of the present invention.

DETAILED DESCRIPTION OF THE DRAWINGS

Figure 1:
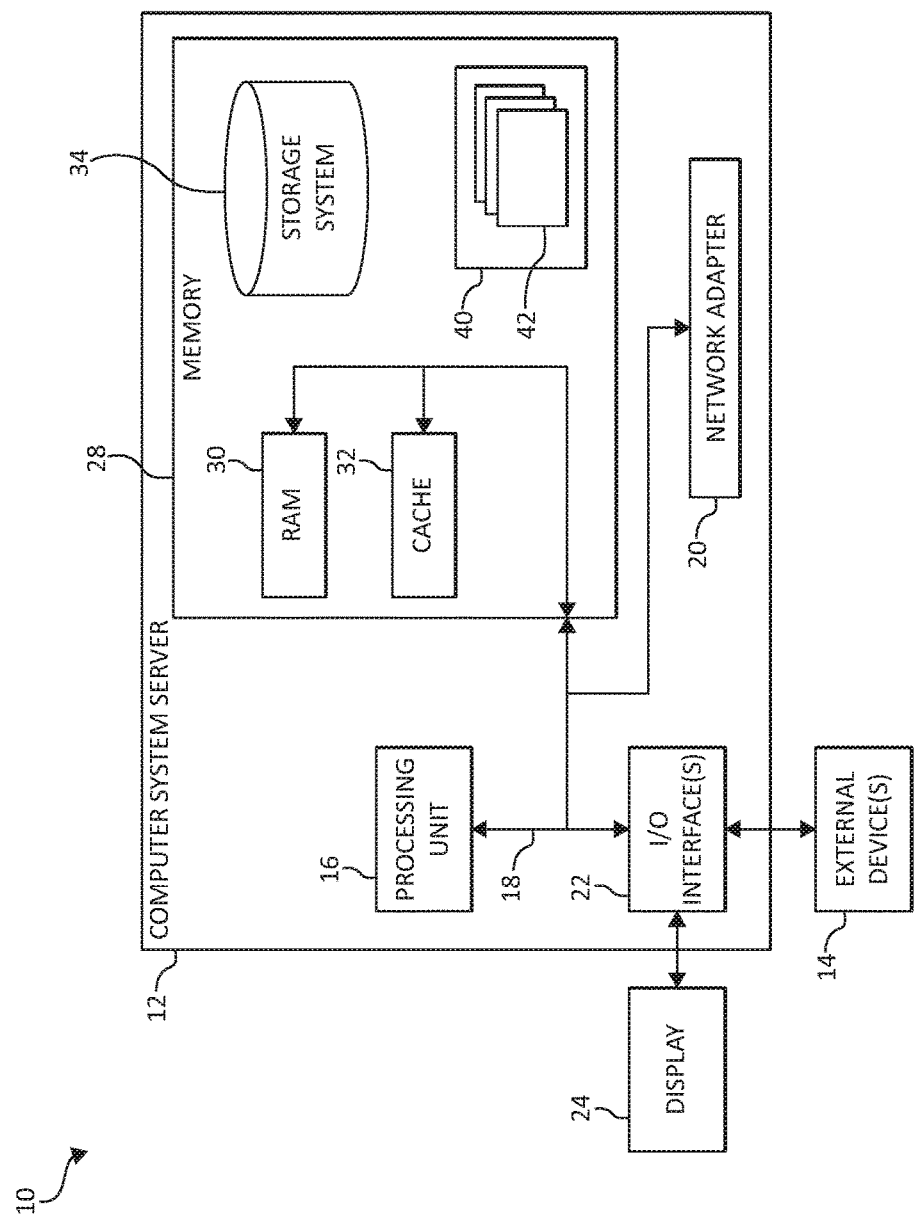
FIG. 1 is a block diagram depicting an exemplary cloud computing node according to an embodiment of the present invention.

As briefly discussed formerly, current large-scale applications and system software are designed for cluster environments such that performance, scalability and high-availability can be achieved. For these reasons, it's not uncommon for systems to incorporate mechanisms to transfer workloads from a failing node to another node, take failing memory off line, and balance workloads among the cluster nodes to ensure the systems are available continually. However, in a multi-node system structure, the possibility exists for multiple processors or I/O devices to simultaneously request the same block of data to be transferred between the nodes, which can lead to situations where resources on different nodes deadlock against each other, thereby hanging the system. For example, Node1 may currently hold resource M and plans to take resource N, while at the same time, Node2 currently holds resource N and plans to take resource M. This "deadlock" situation can lead to a host of performance related issues, and is highly undesirable.

Previous methods have been proposed to identify deadlocks in a single node. However, in a cluster environment, deadlocks often happen in very small time windows and occur between or across multiple nodes, which complicates and constrains detection. Additionally, because of the number of nodes in the cluster and the sheer volume of data logs each node keeps, detecting these deadlocks could prove so time consuming such as to negate any benefit of the detection. For example, assume a cluster having 1000 nodes, where each node has 1 Terabyte of data logs. As one can imagine, analyzing and detecting deadlocks in such a cluster becomes an almost impractical task. However, when equipped with ever-advancing big data analytic technologies, these issues become feasible to be detected, which can help to improve the quality of distributed software.

Accordingly, to improve upon the art, the mechanisms of the present invention implement such functionality as detecting potential deadlocks in the cluster environment by searching for and identifying "resource reverse pairs" of resources of nodes used during transactions among the cluster. These resource reverse pairs are determined by analyzing large trace and/or log files via big data analysis for matching resources which will be used during sub-transactions of a particular transaction. When a matching resource (or resource reverse pair) is found to exist on multiple sub-transactions of a generated transaction resource chain for a particular resource, the resource can be recognized as having the potential to be deadlocked against a resource of another node, and transactions/sub-transactions may be delayed or re-organized to alternate resources to avoid the "collision". It should be noted that, as used herein, the term "resources" may comprise any portion of a computing node. For example, a resource may be a processor, Input/Output (I/O) device or network card, memory, a storage device, a graphical processing unit (GPU) or an accelerator, a network, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
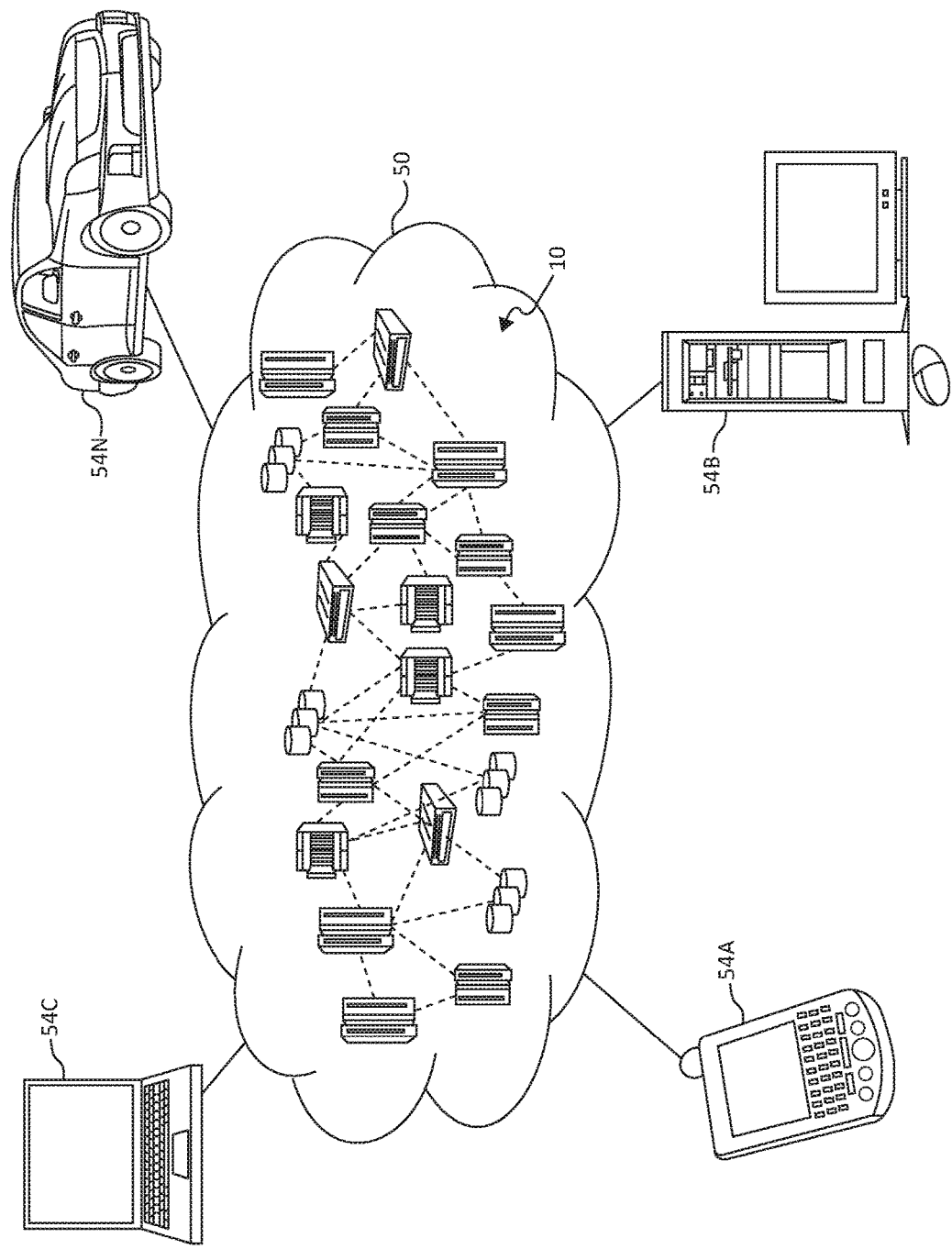
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
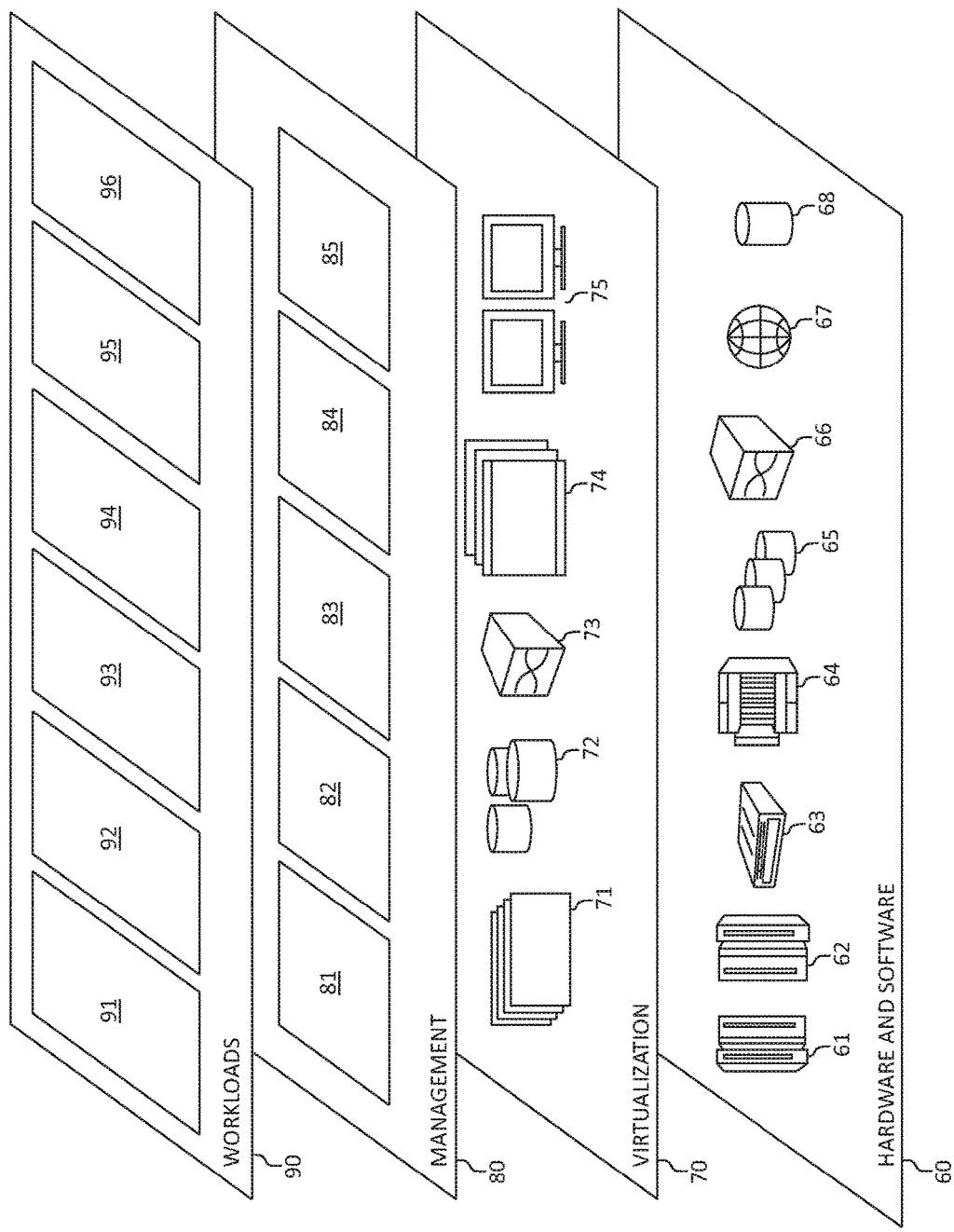
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various data security workloads and functions 96, such as antivirus scanning workloads, or anti-malware scanning workloads. In addition, data security workloads and functions 96 may include such operations as data quarantining and/or data deleting functions. One of ordinary skill in the art will appreciate that the data security workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
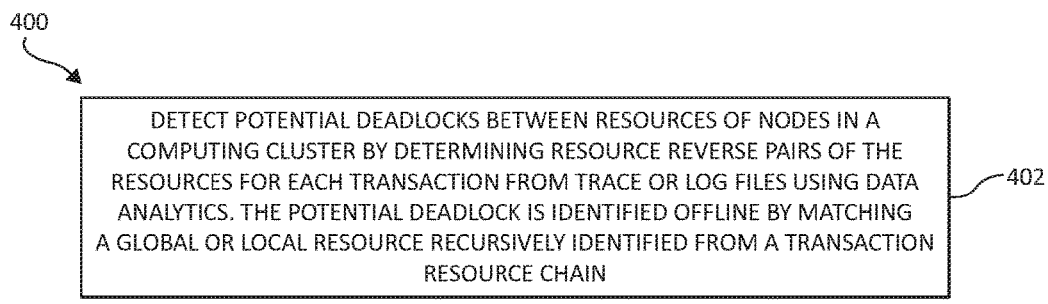
FIG. 4 is a flowchart diagram illustrating an exemplary method for detecting deadlock in a distributed computing environment, by a processor, by which aspects of the present invention may be implemented.

Continuing, FIG. 4 illustrates a method 400 for detecting deadlock in a distributed computing environment, in accordance with one embodiment of the present invention. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

The method 400 begins by detecting potential deadlocks between resources of nodes in a computing cluster by determining resource reverse pairs of the resources for each transaction from trace or log files using data analytics. The potential deadlocks are identified offline by matching a global or local resource between the nodes in sub-transactions of each transaction as recursively identified from a transaction resource chain (step 402). The method 400 ends.

As aforementioned, in one embodiment, the present invention implements functionality to detect and alleviate deadlocks between resources of nodes in computing clusters. As will be further discussed, the mechanisms of the present invention define namespaces using identifiers for transactions, sub-transactions, and resources of the cluster; and record these namespaces in log and/or trace files. Using these log and/or trace files, information regarding transactions and their resource order (the order of which resources will hold sub-transactions of the transactions) are extracted, and this extracted information is used to generate a transaction resource chain using big data analysis. The transaction resource chain of one transaction may then be compared to additional transactions to determine the resource reverse pairs, or simply two matching or identical resources which will be taken by two sub-transactions simultaneously, causing a deadlock of the resources. These potential deadlocks (note the use of the language "potential", as the mechanisms are recursively checking ahead prior to the actual execution of the transactions so as to detect the deadlock without veritably triggering it) may then be avoided by techniques such as delaying the transaction/sub-transaction until the particular resource is freed, or otherwise re-structure the transaction/sub-transaction as to avoid the deadlock.

Figure 5:
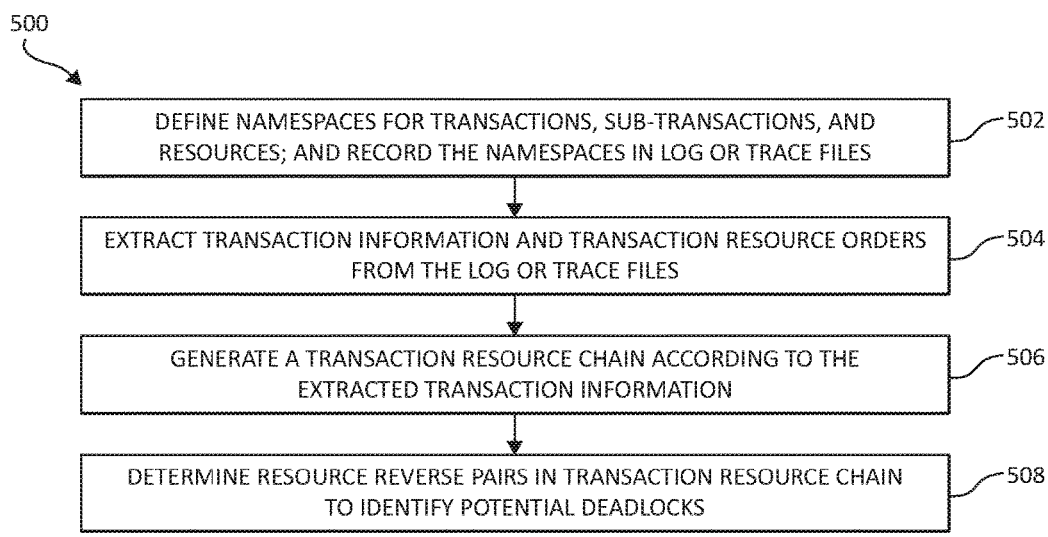
FIG. 5 is an additional flowchart diagram illustrating an exemplary method for detecting deadlock in a distributed computing environment, by a processor, by which aspects of the present invention may be implemented.

FIG. 5 illustrates a method 500 for detecting deadlock in a distributed computing environment, in accordance with one embodiment of the present invention. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

The method 500 begins by defining namespaces for each transaction and sub-transaction of the transactions; and namespaces for each resource associated with a node (step 502). Transaction information and a resource order of each transaction (the order of which resources will hold sub-transactions of the transactions) are extracted from the log and/or trace files (step 504). A transaction resource chain is then generated according to the extracted information of each transaction (step 506), and resource reverse pairs are determined from the transaction resource chain to identify the potential deadlocks (step 508). The method 500 ends. Each step of the method 500 will be further discussed in individual sub-sections, following.

Namespace Definition

Namespaces, which are recorded for each transaction, sub-transaction, and resource, are recorded in the log and/or trace files as follows:

Transaction: A task is a transaction which is made of a group of threads which work together in different nodes in the cluster environment. For example, a transaction is divided into sub-transactions which are executing in threads on different nodes so as to achieve high parallelism, reduce operation time, and improve efficiency. A transaction may be identified by:
1. A cluster identification (ID);
2. A filesystem (FS) ID; and/or
3. A task ID.

Sub-transaction: A sub-transaction is part of a transaction which is launched asynchronously by another sub-transaction. A sub-transaction may be identified by:
1. A transaction ID; and/or
2. A sub-transaction ID.

Resources: Resources of the nodes of the cluster are limited, and any thread which requires an unavailable resource will be halted or fail. Resources are generally defined as being either a global resource, which is visible to threads in all nodes in a cluster and has the potential to block any thread in a cluster; or a local resource, which is only visible to threads in a particular node and has the potential to block any thread in the node. A resource may be identified by:
1. A resource serial number;
2. A scope (whether the particular resource is global or local); and/or
3. A node ID (which is only needed for local resources).

Figure 6:
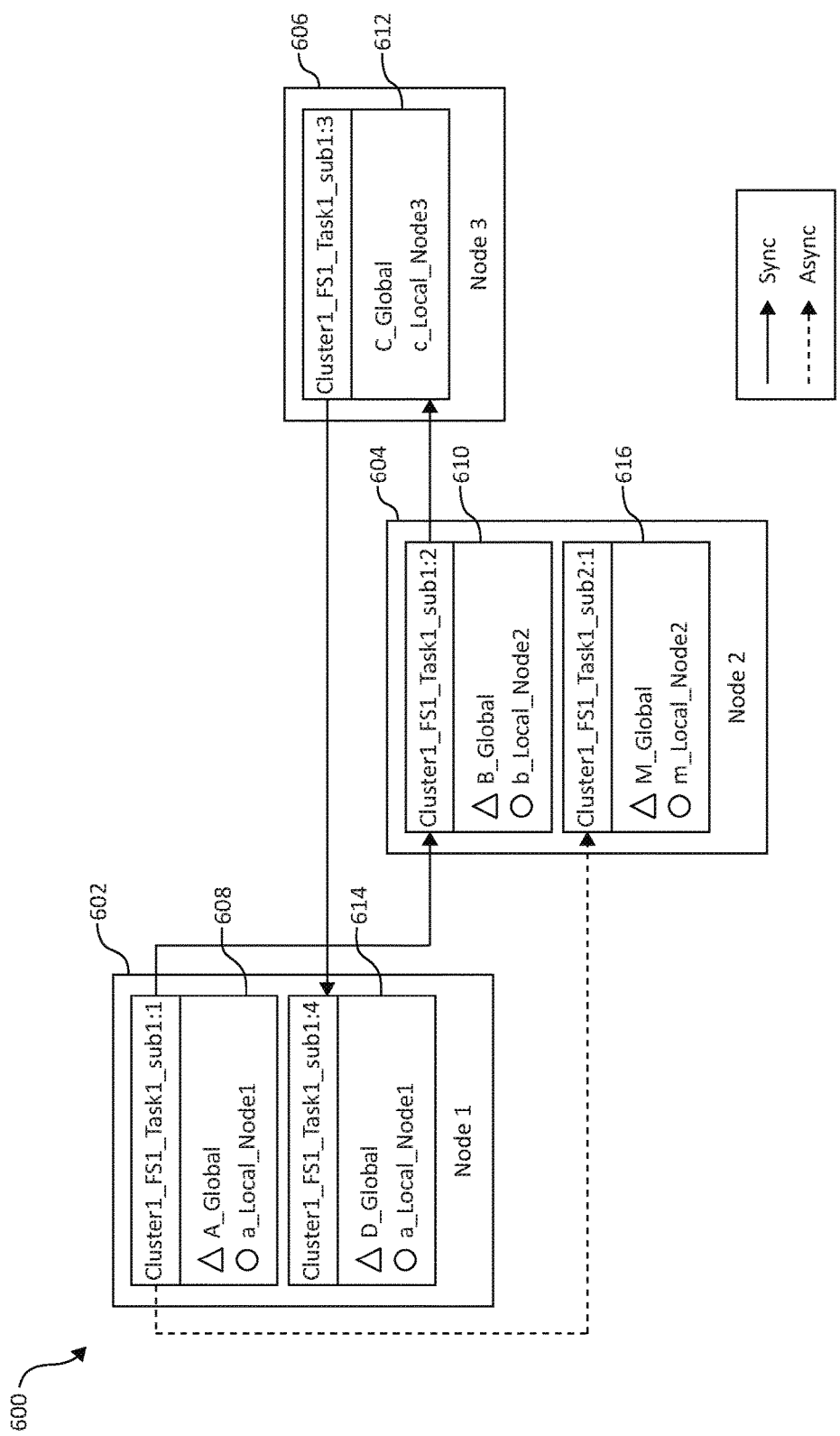
FIG. 6 is a block diagram illustrating resources in relation to transactions and sub-transactions, in accordance with aspects of the present invention.

FIG. 6 is a block diagram 600 illustrating resources in relation to transactions and sub-transactions of a cluster, in accordance with aspects of the present invention. Diagram 600 is depicted to illustrate the namespace definitions as defined while showing resource information of an exemplary transaction labeled as "Cluster1_FS1_Task1". In diagram 600, the transaction consists of two sub-transactions: The transaction labeled as Cluster1_FS1_Task1_sub1 (with 4 steps, labeled as ":1" (block 608), ":2" (block 610), ":3" (block 612), and ":4" (block 614) listed after the sub-transaction ID); and the sub-transaction labeled Cluster1_FS1_Task1_sub2 (block 616). These sub-transactions, or parts thereof, are distributed across three nodes (labeled Node 1 (block 602), Node 2 (block 604), and Node 3 (block 606)) and coordinated by 5 threads.

In this example, Cluster1_FS1_Task1_sub1:1 (block 608) sends a message to Node 2 (block 604) and waits for the reply from Cluster1_FS1_Task1_sub1:2 (block 610). This represents a synchronous relationship (marked by a solid line), and they belong to the same sub-transaction.

While Cluster1_FS1_Task1_sub1:1 (block 608) must wait for a reply from Node 2 (block 604), Cluster1_FS1_Task1_sub1:1 (block 608) does not need to wait until Cluster1_FS1_Task1_sub2:1 (block 616) replies, as the two are an asynchronous relationship (marked by a dashed line), and they belong to different sub-transactions.

If two parts in a sub-transaction are synchronous, the latter part will inherit global resources of its ancestors and local resources of its ancestors only if they are in the same node. For example, Cluster1_FS1_Task1_sub1:2 (block 610) will have resources, "A_Global" (inherited from Cluster1_FS1_Task1_sub1:1 (block 608)), "B_Global" and "b_Local_Node2".

However, if two parts in a sub-transaction are asynchronous, the latter will inherit nothing from the former. For example, Cluster1_FS1_Task1_sub2:1 (block 616) will only have resources: "M_Global" and "m_Local_Node2".

Resource Chain Generator

Figure 7:
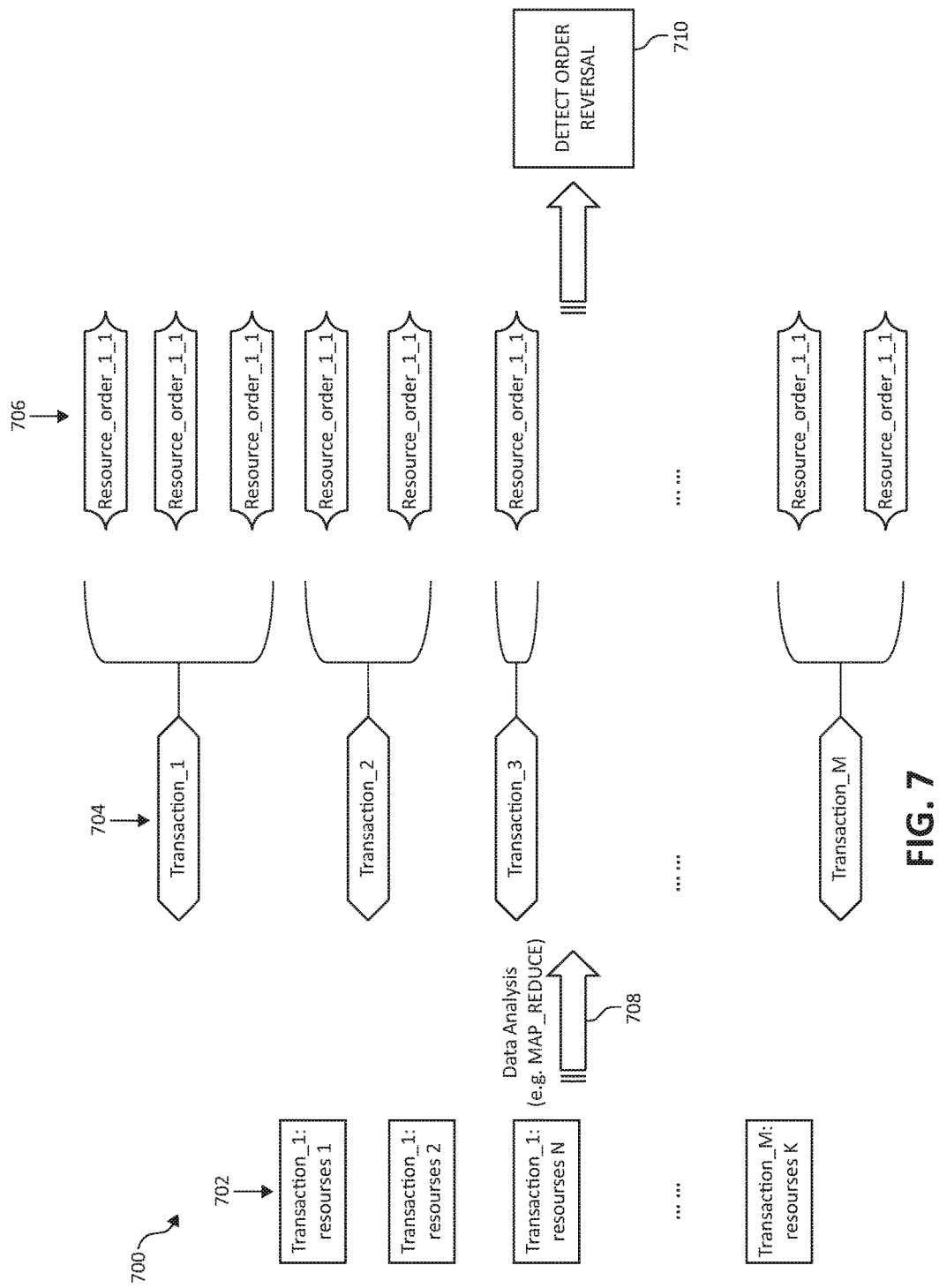
FIG. 7 is a block diagram illustrating the generation of a transaction resource chain, in accordance with aspects of the present invention.

Upon extracting the namespace and resource order information for each transaction, as shown in FIG. 6, big data analysis is leveraged to generate a transaction resource chain using this extracted information, as log/trace files can be very large (e.g., Terabytes). FIG. 7 is a block diagram 700 illustrating the generation of such a transaction resource chain, in accordance with aspects of the present invention. In one embodiment, a sample implementation may be performed by inputting transaction, sub-transaction and resource information (blocks 702) into a data analytic framework (e.g., Map_Reduce) (block 708). That is, because the log/trace files can be of such large size, big data analysis (e.g., Map_Reduce) is utilized to generate the transaction information. The sub-transaction ID then may be used as a key, together with a request time for the resource and the resource ID (blocks 704), to generate a sorted resource occupation chain by the reduce workers (blocks 706). This resource occupation chain (or transaction resource chain) is then used to detect the resource reverse pairs (block 710) of which resources will be taken simultaneously with another part of the sub-transaction, thereby causing a deadlock.

FIG. 8A is a table diagram 800 illustrating a resource chain for a respective transaction, in accordance with aspects of the present invention. Diagram 800 depicts the transaction resource chain generated from the transaction "Cluster1_FS1_Task1" shown in FIG. 6, and having undergone the analytic framework of generating the resource chain illustrated in FIG. 7.

Diagram 800:

| Cluster1_FS1_Task1_sub1 | A_Global->a_Local_Node1-><br>B_Global->b_Local_Node2-><br>C_Global->c_Local_Node3-><br>B_Global->d_Local_Node1 |
|---|---|
| Cluster1_FS1_Task1_sub2 | M_Global->m_Local_Node2 |

Diagram 800, again, depicts the resource order as illustrated by the four parts of the synchronous sub-transaction Cluster1_FS1_Task1 sub1 (block 608), and the asynchronous sub-transaction Cluster1_FS1_Task1_sub2 (block 616), where the synchronous sub-transaction Cluster1_FS1_Task1_sub1 (block 608) has inherited the global resources of its ancestors and local resources of its ancestors only if they are in the same node; and the asynchronous sub-transaction Cluster1_FS1_Task1_sub2 (block 616) has inherited no resources.

Deadlock Detection

Any resource reverse pairs identified when examining the transaction resource chain can be recognized as a deadlock. To identify the resource reverse pairs, two resource sets for each resource are defined in the resource chain: an ancestor set and an inheritor set. If one resource exists both on the ancestor set and the inheritor set of the resource chain, there exists a potential deadlock. FIG. 8B is an additional table diagram 850 illustrating a resource chain between an ancestor set and an inheritor set of resources for a respective transaction, in accordance with aspects of the present invention. More specifically, diagram 850 shows the resource set information for the transaction Cluster1_FS1_Task1 in FIG. 6.

Diagram 850:

| Resource Chain | Resource | Ancestor set | Inheritor set |
|---|---|---|---|
| Cluster1_FS1_Task1_sub1 | A_Global | { } | {a_Local_Node1, B_Global, b_Local_Node2, C_Global, c_Local_Node3, D_Global a_Local_Node1} |
| | a_Local_Node1 | {A_Global} | {B_Global, b_Local_Node2, C_Global, c_Local_Node3, D_Global a_Local_Node1} |
| | B_Global | {A_Global, a_Local_Node1} | {b_Local_Node2, C_Global, c_Local_Node3, D_Global a_Local_Node1} |
| | b_Local_Node2 | {A_Global, a_Local_Node1, B_Global} | {C_Global, c_Local_Node3, D_Global a_Local_Node1} |
| | C_Global | {A_Global, a_Local_Node1, B_Global, b_Local_Node2} | {c_Local_Node3, D_Global a_Local_Node1} |
| | c_Local_Node3 | {A_Global, a_Local_Node1, B_Global, b_Local_Node2, C_Global} | {D_Global a_Local_Node1} |
| | D_Global | {A_Global, a_Local_Node1, B_Global, b_Local_Node2, C_Global, c_Local_Node3} | {a_Local_Node1} |
| | M_Global | { } | {m_Local_Node1} |
| | M_Local_Node2 | {M_Global} | { } |

As can be observed from the transaction resource chain for Cluster1_FS1_Task1, the resource 'a_Local_Node1' appears in both the ancestor set and the inheritor set of resource B_Global. Therefore, there exists a potential for deadlock of the a_Local resource of Node 1 (block 602). To detect these potential deadlocks, and thereby avoid them, the trace and/or log files are laid out in a similar fashion as illustrated in diagram 850, such that analysis may be easily performed to determine the matching resources of the ancestor and inheritor resource sets of the resource chain, or otherwise determine the resource reverse pairs therein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for detecting deadlock in a distributed computing environment, by a processor device, comprising:
   detecting potential deadlocks between resources of nodes in a computing cluster by determining resource reverse pairs of the resources for each transaction from trace or log files generated from additional, separate transactions using data analytics; wherein the potential deadlocks are identified offline, prior to any execution of each transaction, by matching a global or local resource between the nodes in sub-transactions of each transaction as recursively identified from a transaction resource chain having information of an order of the resources to be used during each transaction; and wherein the reverse resource pairs comprise those of the resources determined to collide when being taken by one of the sub-transactions while simultaneously being attempted to be taken by another of the sub-transactions as identified in the transaction resource chain;
   mitigating an occurrence of the potential deadlock by delaying the one of the sub-transactions until the respective resources used during the one of the sub-transactions are freed or restructuring the order of the resources to be used during the one of the sub-transactions;
   defining namespaces for each of the transactions, the sub-transactions, and the resources used by the transactions and sub-transactions; wherein the namespaces are recorded in the log or trace files; and
   extracting information associated with a respective transaction and a resource order of the resources used for the respective transaction from the log or trace files.

2. The method of claim 1, wherein, pursuant to defining the namespaces:
   each transaction is identified by at least one of a cluster identification (ID), a file system ID, and a task ID;
   each sub-transaction is identified by at least one of a transaction ID and a sub-transaction ID; and
   each resource is identified by at least one of a resource serial number, a scope comprising the global or local resource, and a node ID.

3. The method of claim 1, further including generating the transaction resource chain for the respective transaction according to the extracted information.

4. The method of claim 3, further including defining, for each resource, an ancestor set and an inheritor set, the ancestor set and the inheritor set corresponding to the resource order of the resources used in the transaction resource chain for the respective transaction.

5. The method of claim 4, wherein matching the global or local resource between the nodes as recursively identified from the transaction resource chain includes identifying the global or local resource on both the ancestor set and the inheritor set on the transaction resource chain.

6. A system for detecting deadlock in a distributed computing environment, the system comprising:
   a processor device operating within and between distributed computing components, wherein the processor device:
   detects potential deadlocks between resources of nodes in a computing cluster by determining resource reverse pairs of the resources for each transaction from trace or log files generated from additional, separate transactions using data analytics; wherein the potential deadlocks are identified offline, prior to any execution of each transaction, by matching a global or local resource between the nodes in sub-transactions of each transaction as recursively identified from a transaction resource chain having information of an order of the resources to be used during each transaction; and wherein the reverse resource pairs comprise those of the resources determined to collide when being taken by one of the sub-transactions while simultaneously being attempted to be taken by another of the sub-transactions as identified in the transaction resource chain;
   mitigates an occurrence of the potential deadlock by delaying the one of the sub-transactions until the respective resources used during the one of the sub-transactions are freed or restructuring the order of the resources to be used during the one of the sub-transactions;
   defines namespaces for each of the transactions, the sub-transactions, and the resources used by the transactions and sub-transactions; wherein the namespaces are recorded in the log or trace files; and
   extracts information associated with a respective transaction and a resource order of the resources used for the respective transaction from the log or trace files.

7. The system of claim 6, wherein, pursuant to defining the namespaces:
   each transaction is identified by at least one of a cluster identification (ID), a file system ID, and a task ID;
   each sub-transaction is identified by at least one of a transaction ID and a sub-transaction ID; and
   each resource is identified by at least one of a resource serial number, a scope comprising the global or local resource, and a node ID.

8. The system of claim 6, wherein the processor device generates the transaction resource chain for the respective transaction according to the extracted information.

9. The system of claim 8, wherein the processor device defines, for each resource, an ancestor set and an inheritor set, the ancestor set and the inheritor set corresponding to the resource order of the resources used in the transaction resource chain for the respective transaction.

10. The system of claim 9, wherein matching the global or local resource between the nodes as recursively identified from the transaction resource chain includes identifying the global or local resource on both the ancestor set and the inheritor set on the transaction resource chain.

11. A computer program product for detecting deadlock in a distributed computing environment, by a processor device, the computer program product comprising a physical, non-transitory computer-readable storage medium having computer-readable program code portions stored therein, the computer-readable program code portions comprising:
   an executable portion that detects potential deadlocks between resources of nodes in a computing cluster by determining resource reverse pairs of the resources for each transaction from trace or log files generated from additional, separate transactions using data analytics; wherein the potential deadlocks are identified offline, prior to any execution of each transaction, by matching a global or local resource between the nodes in sub-transactions of each transaction as recursively identified from a transaction resource chain having information of an order of the resources to be used during each transaction; and wherein the reverse resource pairs comprise those of the resources determined to collide when being taken by one of the sub-transactions while simultaneously being attempted to be taken by another of the sub-transactions as identified in the transaction resource chain;
   an executable portion that mitigates an occurrence of the potential deadlock by delaying the one of the sub-transactions until the respective resources used during the one of the sub-transactions are freed or restructuring the order of the resources to be used during the one of the sub-transactions;
   an executable portion that defines namespaces for each of the transactions, the sub-transactions, and the resources used by the transactions and sub-transactions; wherein the namespaces are recorded in the log or trace files; and
   an executable portion that extracts information associated with a respective transaction and a resource order of the resources used for the respective transaction from the log or trace files.

12. The computer program product of claim 11, wherein, pursuant to defining the namespaces:
   each transaction is identified by at least one of a cluster identification (ID), a file system ID, and a task ID;
   each sub-transaction is identified by at least one of a transaction ID and a sub-transaction ID; and
   each resource is identified by at least one of a resource serial number, a scope comprising the global or local resource, and a node ID.

13. The computer program product of claim 11, further including an executable portion that generates the transaction resource chain for the respective transaction according to the extracted information.

14. The computer program product of claim 13, further including an executable portion that defines, for each resource, an ancestor set and an inheritor set, the ancestor set and the inheritor set corresponding to the resource order of the resources used in the transaction resource chain for the respective transaction.

15. The computer program product of claim 14, wherein matching the global or local resource between the nodes as recursively identified from the transaction resource chain includes identifying the global or local resource on both the ancestor set and the inheritor set on the transaction resource chain.

* * * * *